United States Patent [19]

Vande Linde

[11] Patent Number: 5,613,827
[45] Date of Patent: Mar. 25, 1997

[54] DUAL ARM LUMBER STACKER ASSEMBLY

[76] Inventor: Gary F. Vande Linde, P.O. Drawer A, Meldrim, Ga. 31318-0051

[21] Appl. No.: 501,628

[22] Filed: Jul. 12, 1995

[51] Int. Cl.$^6$ ................................................. B65G 57/18
[52] U.S. Cl. .................................. 414/791.6; 414/793.5; 414/794.1
[58] Field of Search ............................ 414/791.6, 793.4, 414/793.5, 794.1, 794.3

[56] References Cited

U.S. PATENT DOCUMENTS

| | | |
|---|---|---|
| 2,397,720 | 4/1946 | Beane . |
| 2,686,603 | 8/1954 | Lawson . |
| 2,730,247 | 1/1956 | Lawson . |
| 2,838,185 | 6/1958 | Horstkotte . |
| 2,915,202 | 12/1959 | Aitken . |
| 2,953,239 | 9/1960 | Garman et al. . |
| 3,456,774 | 7/1969 | Blickenderfer et al. . |
| 3,606,310 | 9/1971 | Larson . |
| 3,675,793 | 7/1972 | Werzel ........................ 414/794.1 X |
| 4,147,258 | 4/1979 | Kaplan . |
| 4,274,781 | 6/1981 | Rysti . |
| 4,290,723 | 9/1981 | Johansson . |

Primary Examiner—David A. Bucci
Assistant Examiner—Janice L. Krizek
Attorney, Agent, or Firm—Dennis H. Lambert

[57] ABSTRACT

An article stacking apparatus, especially for stacking and forming packages of lumber, includes a plurality of elongate, parallel stacker arms for engaging and lifting courses of lumber onto a stack consisting of multiple courses to form a package. The stacker arms are oriented parallel to the direction of movement of lumber conveyed to the stacking apparatus, and transverse to the longitudinal axis of the lumber, and are spaced so that each piece of lumber spans at least two arms to be supported thereby. The stacker arms each have a rearward end carried by a drive chain disposed around a pair of spaced sprockets, and a forward end positioned to engage and lift a course of lumber as it is formed in the apparatus, for deposit of the course onto a stack. The stacker arms are each pivotally supported between their ends on a slide bearing which moves fore and aft with movement of the arms, and parallel to the direction of movement of the arms, so that as the rearward ends of the arms are carried around the sprockets by the drive chain, the arms are caused to pivot on the slide bearing, thereby causing the forward ends of the arms to be elevated and lowered as the arms reach their extended and retracted positions.

20 Claims, 9 Drawing Sheets

DUAL ARM LUMBER STACKER ASSEMBLY

FIELD OF THE INVENTION

This invention relates generally to article handling machinery, especially to machinery for organizing and stacking articles into packages for subsequent handling. More specifically, the present invention relates to an apparatus for stacking a plurality of boards of like dimension and grade to form a unitary package for ease in handling.

BACKGROUND OF THE INVENTION

Plural articles of like kind are frequently gathered in unitary packages for ease in handling during shipment and storage. For instance, wood and paper products, steel, bricks, concrete blocks, concrete slabs, pipes, poles, plywood sheets, particle board, and the like, are frequently packaged to facilitate handling of the articles.

Lumber products are typically manufactured in a variety of lengths, ranging from eight feet up to twenty feet, e.g., conventional dimension lumber is manufactured in lengths of 8, 10, 12, 14, 16, 18 and 20 feet, respectively. Following manufacture, this lumber is sorted according to length, width, thickness and grade and then bundled in packages according to the dimensions and grade of the lumber. That is, all boards having nominal dimensions of two inches by eight inches by eight feet, for example, and having a pre-determined grade, i.e., grade 1, grade 2 etc., are bundled together in a package consisting of from about 200 to 300 boards, and these packages are then shipped to various points of use and/or sale. Similar packages are formed of lumber having different dimensions and grade.

Various machinery has been developed in the prior art to automatically sort and stack lumber products. Some prior art machinery is capable of handling lumber in a variety of lengths and some includes independently operable stacker arms. However, all such prior art machinery is relatively complex and expensive in construction and operation. Moreover, conventional lumber stacking machinery sometimes will not operate quickly enough to keep up with other pieces of equipment in a lumber mill. Additionally, conventional machinery generally does not have any means to enable the stacker to keep operating while maintenance or repair is being performed, whereby failure or breakdown in one part of the machine will generally necessitate shut down of the entire machine.

Accordingly, there is need for lumber stacking machinery that is simple and inexpensive in construction and operation, and which operates at a relatively high speed so that stacking of the lumber to form packages can proceed at a pace equivalent to the pace of operation of other machinery in the process. Further, such machinery should be capable of continued operation while maintenance or repair is being performed, and should be capable of handling all normal sizes of lumber products without requiring adjustment or modification of the machine.

SUMMARY OF THE INVENTION

It is therefore an object of this invention to provide a lumber stacking machine which is simple and inexpensive in construction and operation, and which operates at a rate of speed substantially greater than conventional lumber stacking machines.

Another object of the invention is to provide a lumber stacking machine that is capable of handling all conventional sizes of dimension lumber, ranging in length from about 8 feet up to about 20 feet.

A further object of the invention is to provide a lumber stacking machine in which a plurality of lumber stacking arms are operated to engage and move a plurality of boards arranged in a lumber course to form a stack of such courses, thereby making a package, and in which some of the arms are operated independently of the others so that one set of arms can continue to operate even if the other set of arms is not.

Yet another object of the invention is to provide a lumber stacking machine incorporating dual sets of independently actuatable lumber stacking arms arranged to operate out of phase with one another, but synchronized for alternating movement, thereby effectively doubling the speed of operation of the machine.

A still further object of the invention is to provide a lumber stacking apparatus having a plurality of stacker arms that engage and stack successive courses of lumber, and wherein a minimum number of simple and inexpensive parts are used.

These and other objects and advantages of the invention are achieved by a lumber stacking apparatus positioned to receive lumber from a sorting station that sorts the lumber according to length, width, thickness and grade, and to stack the lumber in multiple courses to form a package of lumber of like dimensions and grade.

The lumber stacking apparatus of the invention comprises a plurality of elongate stacking arms arranged transversely to the longitudinal axis of the lumber supplied thereto, and operated to engage and lift a course of lumber formed in the apparatus and to move that course of lumber forwardly and lower it onto a stack of lumber and to then withdraw into a position for engaging and lifting a subsequent course of lumber to move it forwardly and deposit it onto the stack to form a package formed of multiple courses of lumber.

The arms are connected at their rearward ends to an endless chain drive disposed on spaced sprockets so that the rearward end of the arms is constrained to move fore and aft as well as up and down.

The arms are supported between their ends on a slide bearing that moves horizontally fore and aft in a predetermined plane, and the forward ends of the arms project beyond the slide bearing to a free end which is moved fore and aft and up and down as the rearward end of the arm is carried by the chain around the spaced sprockets. The range and rate of movement of the arms are designed to cooperate with the rest of the apparatus so that courses of lumber are formed, lifted, and deposited on a stack in timed sequence.

The arms are preferably arranged in two sets of independently actuated arms organized in pairs consisting of one arm from each set and actuated so that the arms of one set are in a projected or forward position while the arms of the other set are in a retracted or rearward position. The arms of the respective sets are actuated out of phase with one another but in synchronization so that they alternately engage and move courses of lumber to form a stack of the lumber in making a package.

With the arrangement thus described, the rate of speed of operation of the stacker is greatly increased over conventional apparatus, and the redundancy provided by the independently driven sets of arms enables one set to continue to be operated to continue to form stacks of lumber even if one set of arms should become disabled or require maintenance or repair. Moreover, the manner in which the arms are supported and operated is simple and economical, requiring fewer and less expensive parts and components than prior art devices.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF THE PREFERRED EMBODIMENTS.

Figure 1:
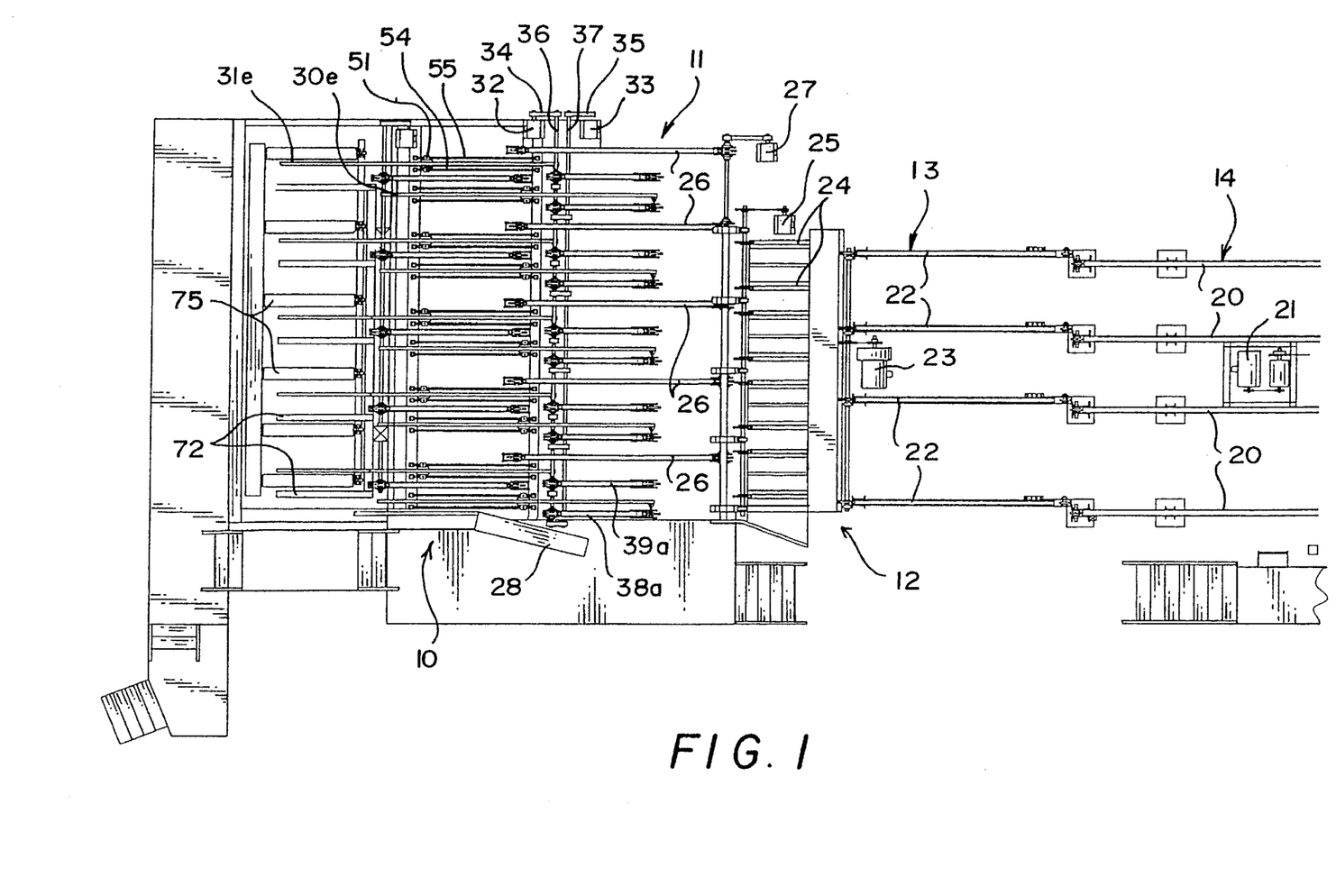
FIG. 1 is a top plan view of an apparatus according to the invention, showing the stacker arm assembly of the invention in relation to other elements used in a lumber stacking machine.
Figure 2:
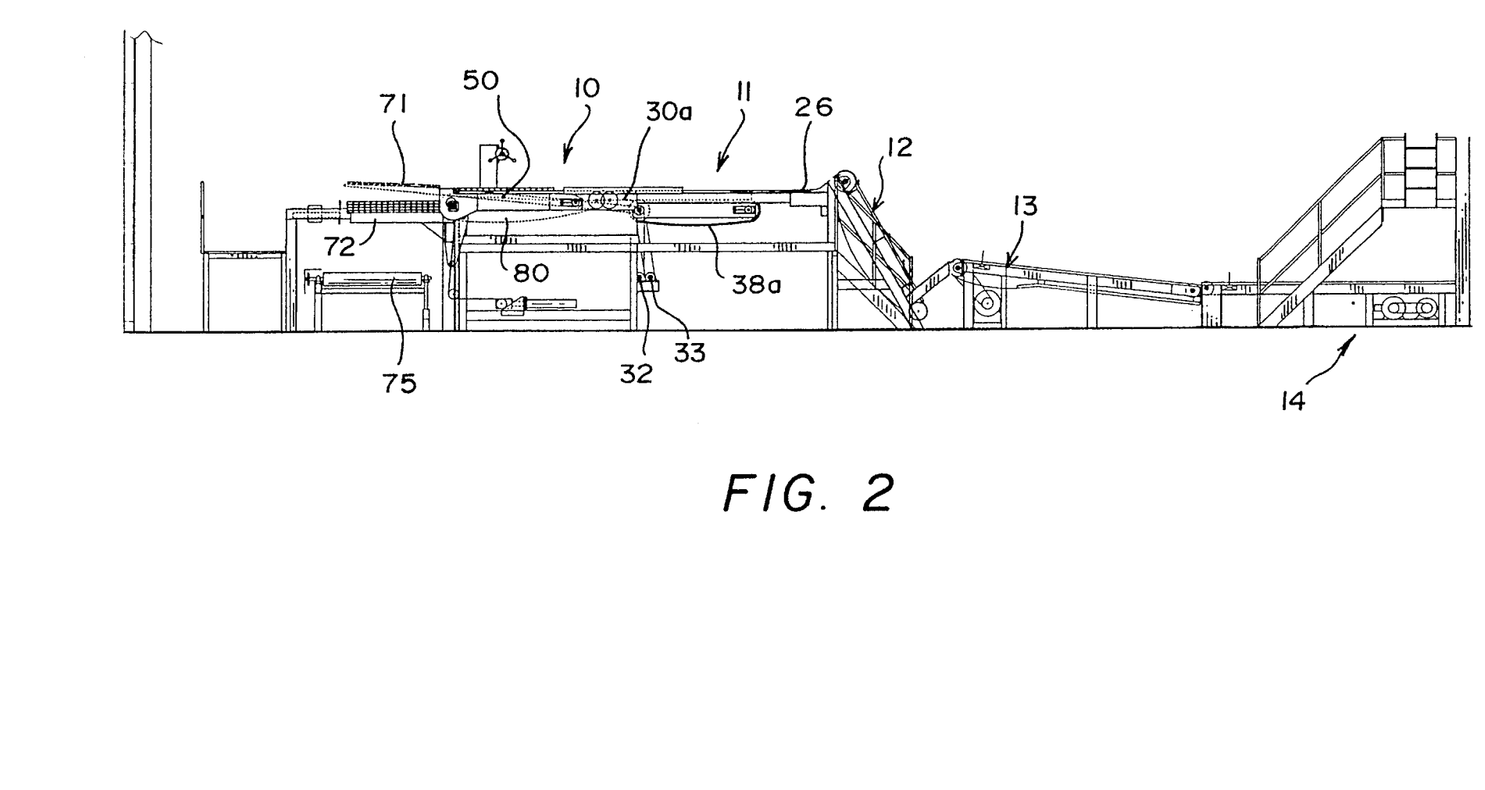
FIG. 2 is a side view in elevation of the apparatus shown in FIG. 1.
Figure 3:
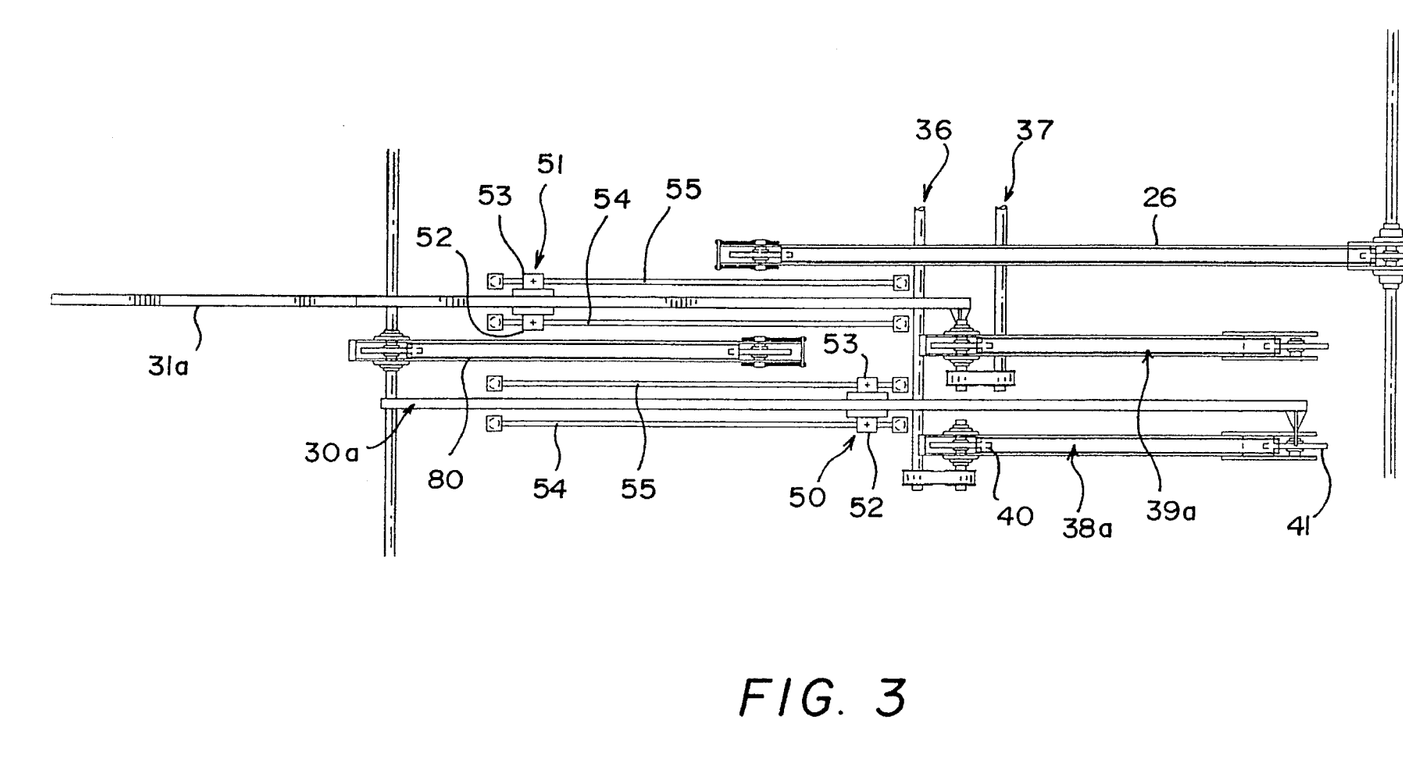
FIG. 3 is an enlarged fragmentary plan view of a portion of the stacker arm assembly of FIGS. 1 and 2.
Figure 4:
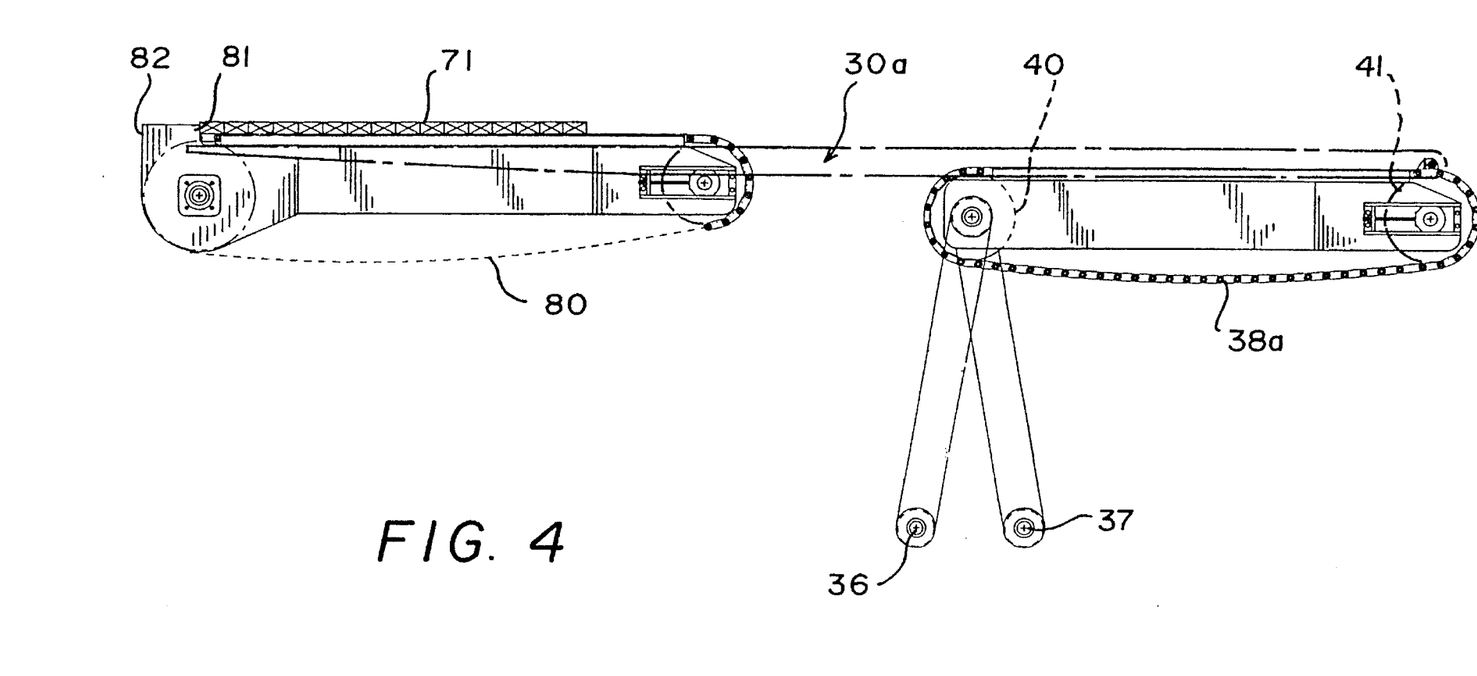
FIG. 4 is an enlarged fragmentary side view in elevation of the stacker arm drive chain and the stacker chain used in the assembly of FIGS. 1 through 3.

Referring more specifically to the drawings, a dual arm lumber stacking assembly according to the invention is indicated generally at 10 in FIGS. 1, 2 and 3. The stacker assembly 10 receives boards of like dimensions and grade from a transfer section 11 that transfers the boards to the stacker section from an unscrambler section 12 that feeds boards in one layer to the transfer section from an incline section 13 where boards are typically deposited several layers deep from a sorter section 14 that sorts the boards according to length, width, thickness and grade and deposits them into sorter bins (not shown).

Boards of like kind are conveyed forwardly from the sorter bins by sorter bin removal chains 20 driven from a sorter chain drive 21.

The incline section 13 includes a plurality of chains 22 extending upwardly and forwardly from the discharge end of the sorter bin removal chains 20, for depositing the sorted lumber into the unscrambler section 12. An incline chain drive 23 is connected to drive the incline chains 22.

The unscrambler section 12 comprises a plurality of steeply inclined chains 24 having lugs or other suitable means thereon for engaging a single layer of boards supplied from the incline section and conveying the single layer of boards upwardly and forwardly onto the transfer section. An unscrambler drive motor 25 is connected to drive the unscrambler chains 24.

The transfer section 11 includes a plurality of forwardly extending transfer chains 26 arranged to receive the single layer of boards from the unscrambler section and convey them forwardly to the stacker section 10. A transfer chain drive 27 is connected to operate the transfer chains 26, and an even ender 28 is positioned to engage the ends of the boards carried on the transfer chains to position all of the ends of the boards in alignment with one another before they are supplied to the stacker section. The even ender may comprise any suitable means, such as a movable belt (not shown) disposed in the path of movement of the adjacent ends of boards carried on the transfer chains.

The stacker assembly or section 10 comprises two sets of elongate stacker arms 30a–30e and 31a–31e, respectively, (see FIG. 10), driven independently of one another by a pair of drive motors 32 and 33, respectively. The motors 32 and 33 are coupled via suitable drive means 34 and 35, respectively, with respective drive shafts 36 and 37 that are, in turn, connected with respective stacker arm drive chains 38a–38e and 39a–39e (see FIG. 10).

The stacker arm drive chains are disposed around spaced sprockets 40 and 41 for continuous movement (counter-clockwise in the specific example shown and described herein), and the rearward ends of the stacker arms 30a–30e are carried by the drive chains 38a–38e, respectively, while the stacker arms 31a–31e are carried by the drive chains 39a–39e.

Figure 10:
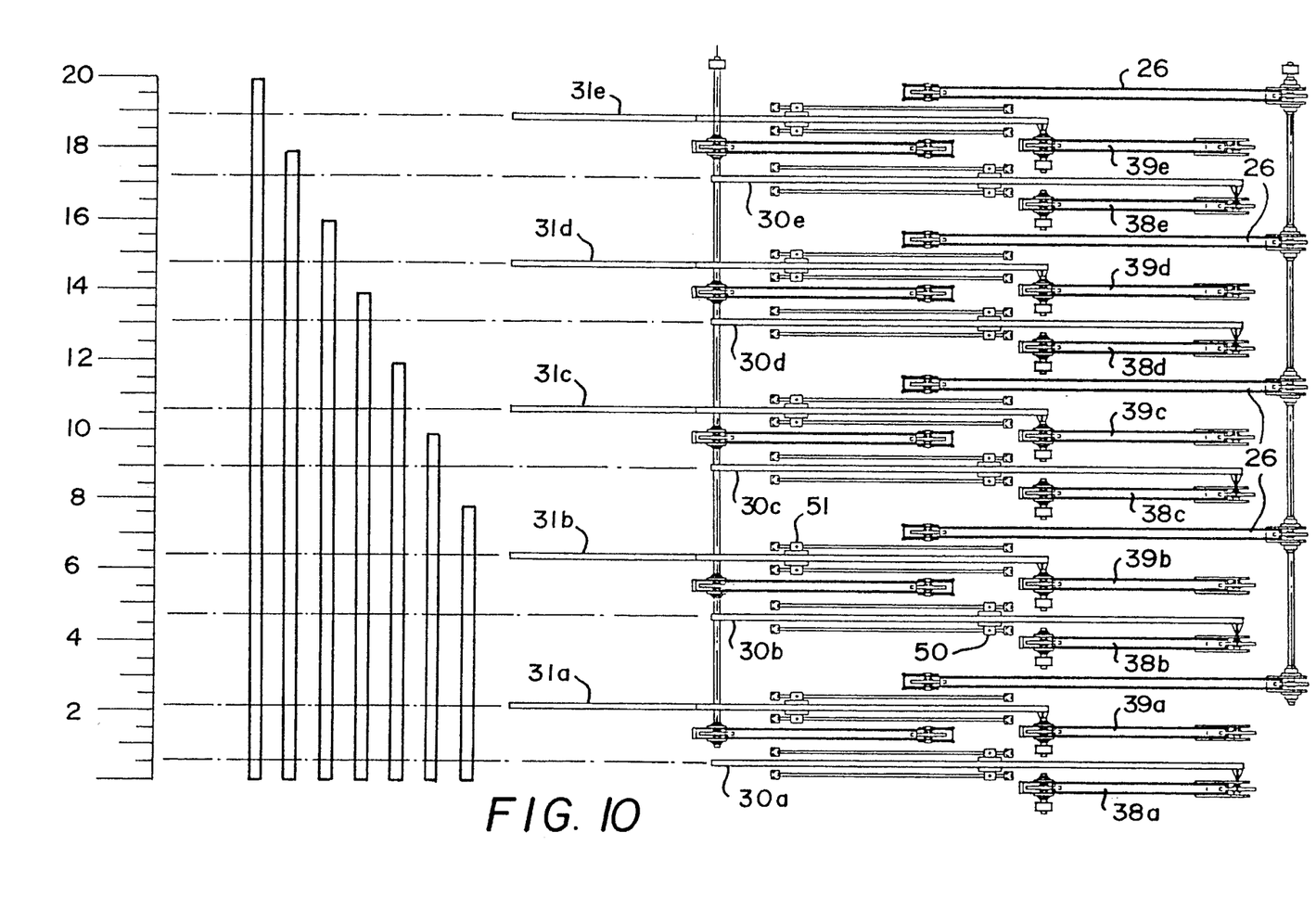
FIG. 10 is a somewhat schematic plan view of the stacker arm assembly of the invention, showing the relationship of the arms to various board lengths.

The stacker arm drive chains and associated stacker arms are driven so that they are 180° out of phase with one another but in synchronization, whereby as the arms 30a–30e in one set are fully retracted, the arms 31a–31e in the other set are fully extended. This is best illustrated in FIGS. 3, 10 and 12. By referring to FIG. 12, especially, one set of arms 30a is indicated in full lines and the other set of arms 31a is indicated in broken lines. Thus, as the rearward end of one arm 30a is positioned at the top of a rear sprocket 41, the rearward end of the other arm 31a is positioned at the bottom of a forward sprocket 40 (see FIG. 12a), and as the rearward end of arm 30a is at the bottom of forward sprocket 40, the rearward end of arm 31a is at the top of rear sprocket 41 (see FIG. 12c).

The arms 30a–30e and 31a–31e of the respective sets are supported between their ends on slide bearings 50 and 51, respectively, mounted for fore and aft horizontal movement as the arms are carried fore and aft by their respective drive chains. Thus, as the rearward ends of the arms move downwardly around the rear sprocket 41, the arm is pivoted about the slide bearing to raise or elevate the forward end of the arm, and as the rearward end of the arm moves upwardly about a forward sprocket 40, the arm pivots about the slide bearing to lower the forward end of the arm. The slide bearing moves fore and aft commensurate with fore and aft movement of the arm, whereby the angle of inclination of the arm remains constant during its movement between its extended and retracted positions.

Figures 11A, 11B, 11C:
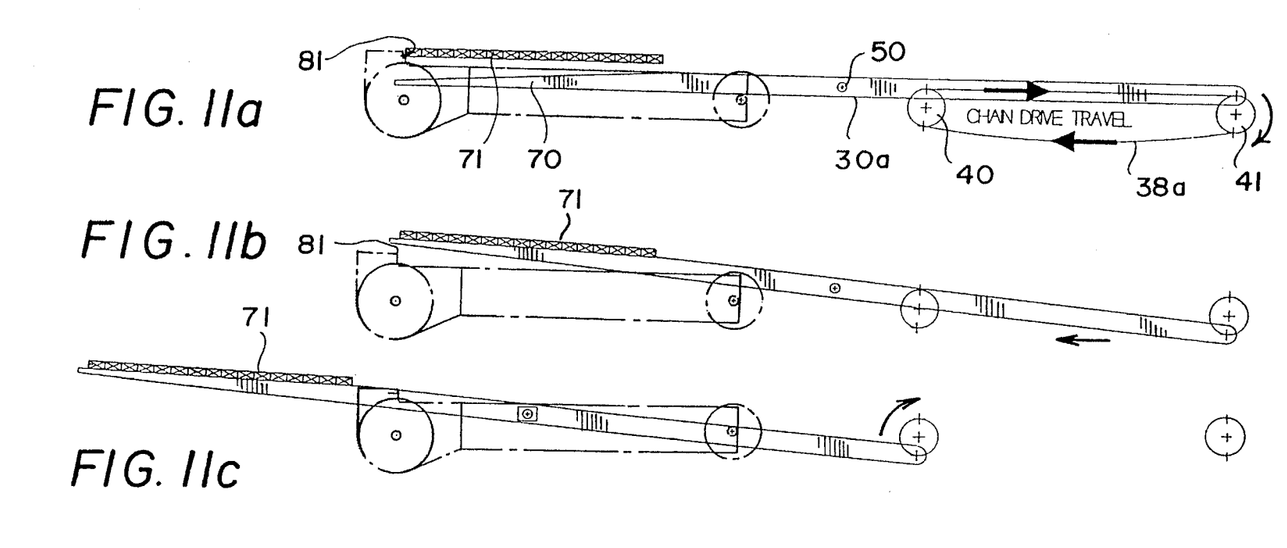
FIGS. 11a through 11e are schematic side views in elevation showing the various stages of operation of a stacker arm during its movement cycle.
Figure 11D:
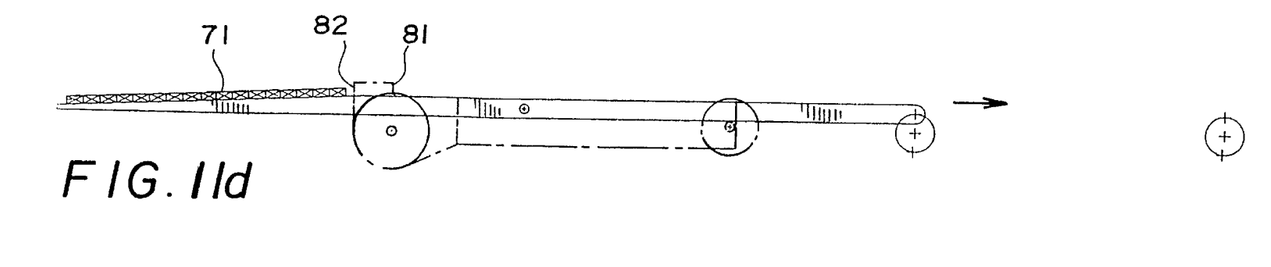
Figure 11E:
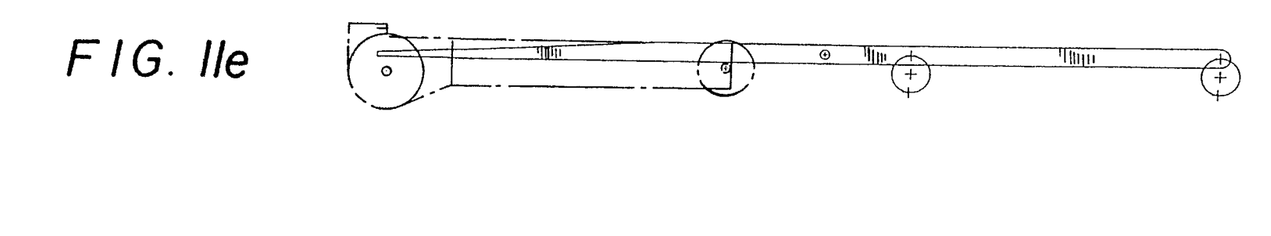
Figure 12A:
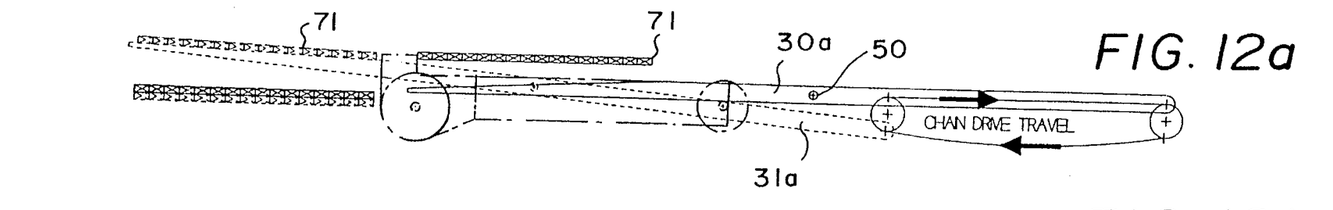
FIGS. 12a through 12e are views similar to FIG. 11, but showing the positional relationships between the arms in the first and second sets of stacker arms used in the assembly of the invention, illustrating how the arms in the two sets alternate with one another in lifting and moving a course of lumber forward to place it on a stack.
Figures 12B, 12C:
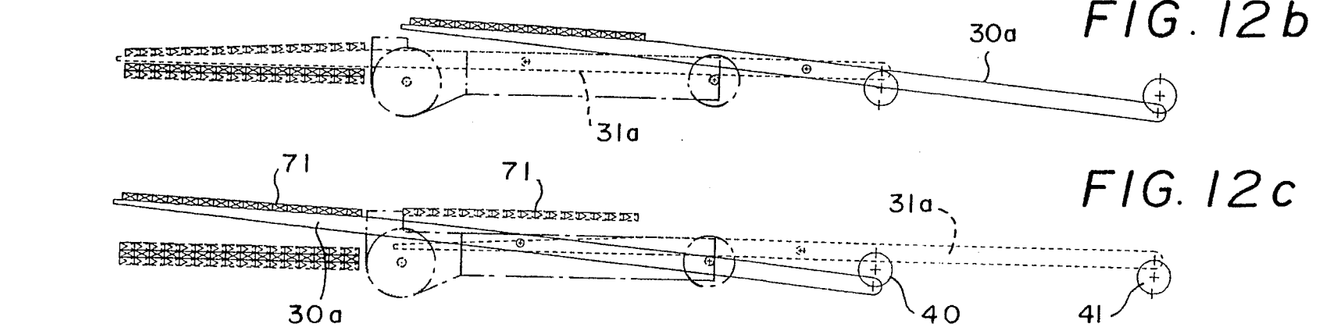
Figure 12D:
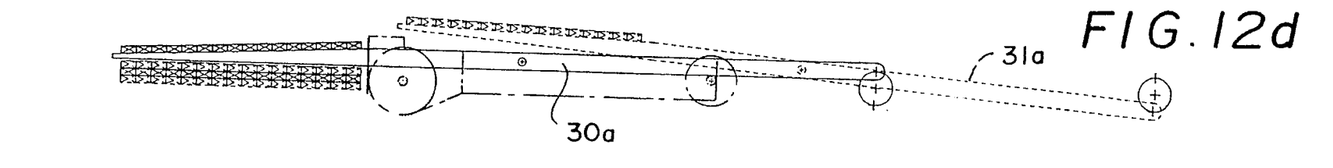
Figure 12E:
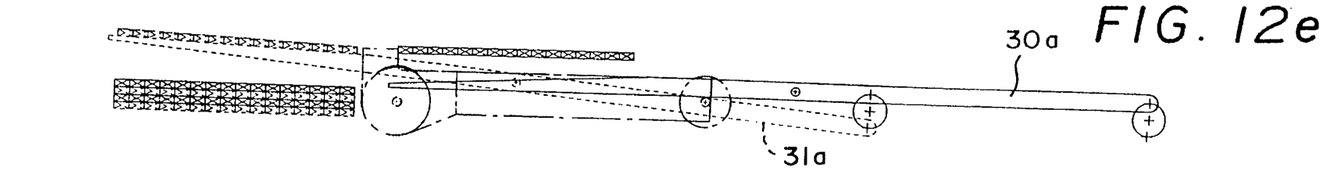

As seen best in FIG. 11, the forward upper edge of each arm is tapered at 70, defining a slightly downwardly sloping support surface when the arm is in a horizontal position as seen in FIG. 11a. As the rearward end of the arm is carried downwardly around sprocket 41, the forward end of the arm raises to engage and lift a course of lumber 71. As the arm is carried forwardly by the lower flight of drive chain 38a extending between sprockets 40 and 41, the slide bearing 50 moves forwardly with the arm, maintaining a constant angle of inclination of the arm until the arm reaches its forward-most position. As the rearward end of the arm moves upwardly around sprocket 40, the arm pivots about the slide bearing and the forward end of the arm is lowered to position the course 71 of lumber behind board stop 82, and as the arm is moved rearwardly in horizontal position by the upper flight of the chain 38a moving between sprockets 40 and 41, the course of lumber is dragged off the arm and remains in position on a set of carriage arms 72, which support the course of lumber and are indexed downwardly a distance equal to the thickness of a course of lumber for reception of a subsequent course of lumber supplied by the other set of arms. This cycle is repeated, with the arms in the two sets alternating with one another until a full package of lumber is formed by successive courses, whereupon the package is conveyed away from the stacker assembly by rollers 75 or other suitable means.

The courses of lumber 71 are formed by stacker chains 80 positioned in overlapping relationship with the transfer chains 26 to receive lumber from the transfer chains and carry it forwardly to lumber stop 81, which limits forward movement of the lumber so that subsequent boards conveyed forward by the stacker chains 80 abut one another to form a course of lumber 71. When a predetermined number (sixteen, for example) of boards are engaged against stop 81, forming a course, the boards are detected by suitable sensing means, such as a photocell or limit switch, to actuate the arms to lift and move that course. At the same time, the advance of lumber by the stacker chains is temporarily halted.

Appropriately placed photocells and limit switches (not shown) are provided throughout the machinery to sense the presence of lumber and actuate the appropriate drive motors in proper sequence to cause the various chains to be operated and to cause the stacker arms to engage and remove courses of lumber as they are formed.

Figures 5, 6, 7:
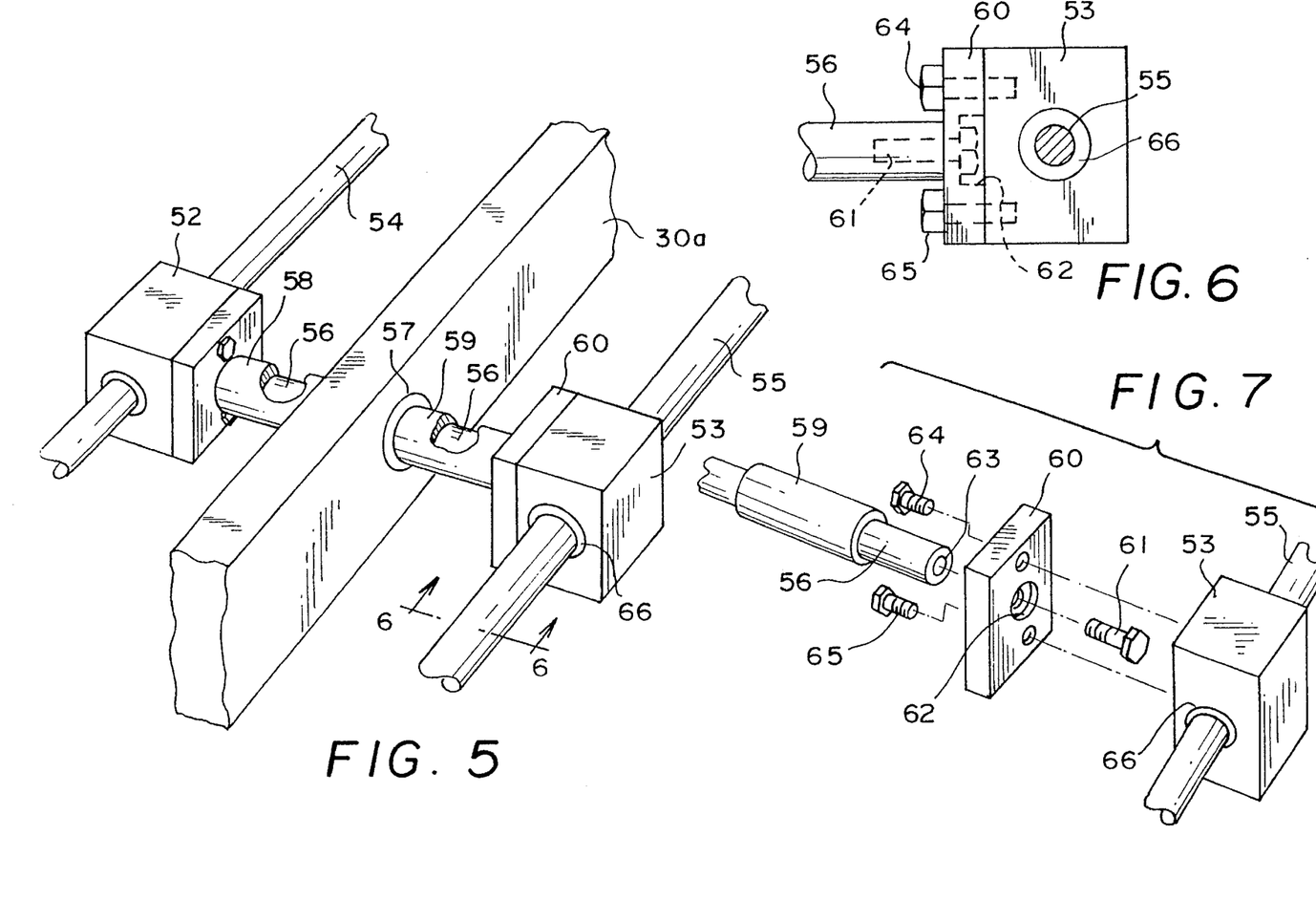
FIG. 5 is a greatly enlarged fragmentary perspective view of the slide bearing and connection to the stacker arm used in the invention.
FIG. 6 is a transverse sectional view taken along line 6—6 in FIG. 5.
FIG. 7 is an exploded perspective view of a portion of the slide bearing assembly of FIG. 5.

The construction of a slide bearing 50 and its connection with an arm 30a is seen best in FIGS. 5–7. Each slide bearing comprises a pair of slide blocks 52 and 53 slidably mounted on a pair of spaced rods 54 and 55 extending parallel to one another and parallel to the direction of movement of the stacker arm drive chains. A pivot shaft 56 extends between the slide blocks 52 and 53 and is received in a bearing 57 mounted in the arm 30a for pivotal support of the arm on the bearing blocks. Any suitable means, such as spacer sleeves or the like 58 and 59, may be provided on the pivot shaft 56 on opposite sides of the arm 30a to keep it centered between the slide blocks 52 and 53.

Although any suitable means may be provided to connect the pivot shaft 56 with the slide blocks 52 and 53, one example comprises mounting blocks 60 which are secured to each end of shaft 56 by a fastening bolt 61 extended through a recessed opening 62 in the block and into a threaded opening 63 formed in the end of the shaft. The mounting block 60, in turn, is secured to the side of the slide block by a pair of bolts 64 and 65 extended through the mounting block 60 and into the side of the slide block.

Each slide block may include a bronze bushing 66 or other means to facilitate movement of the block on the slide rods 54 and 55, which may be polished.

As seen best in FIGS. 11a–11e, the rods 54 and 55 and the slide blocks for the slide bearing are positioned in the same plane as the stacker arm when the arm is in its horizontal position and connected for movement with the upper flight of the drive chain 38a. Further, the positioning of the slide block 50 relative to the point of connection of the arm with the drive chain, and the location of the drive chain relative to the stacker chains and the lumber stops 81, 82 is such that when the arm is in its rearward-most position the tapered forward end 70 is positioned beneath a course of lumber 71 that has been formed against board stop 81, and when the arm is elevated as the rearward end moves to the bottom side of sprocket 41, the course of lumber is lifted above the board stop so that subsequent forward movement of the arm will carry the course of lumber past the stop. Then, as the rearward end of the arm is carried to the top of sprocket 40, the forward end of the arm is lowered to position the course of lumber behind board stop 82, whereby the course of lumber will be dragged off the arm as the arm is moved rearwardly to the position shown in FIG. 11e.

Figures 8, 9:
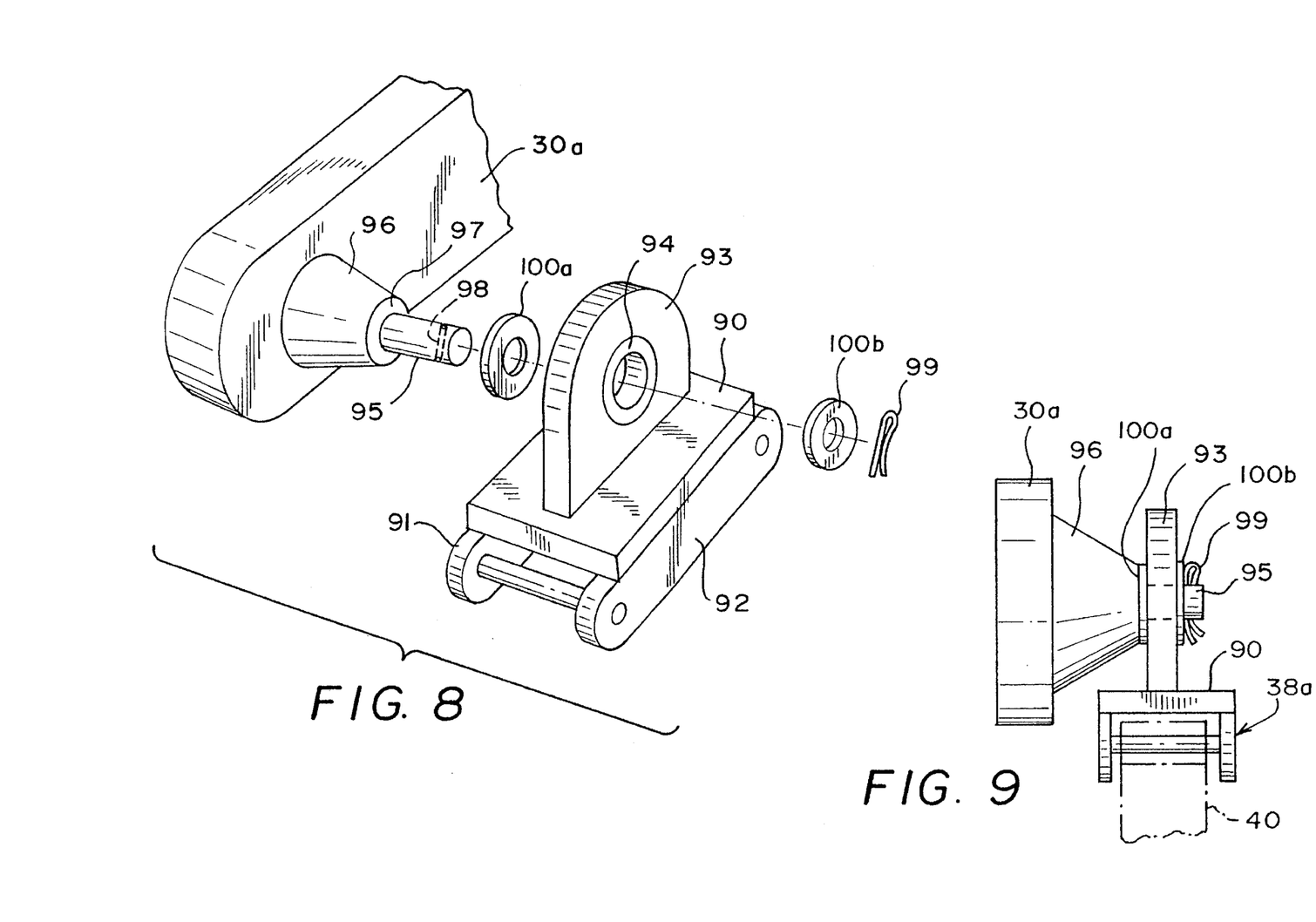
FIG. 8 is an exploded perspective view of the connection between the rearward end of the stacker arm and the drive chain used in the assembly of the invention.
FIG. 9 is an end view in elevation of the stacker arm and drive chain attachment of the invention.

The connection between the rearward end of an arm and its associated drive chain is shown best in FIGS. 8 and 9. Each attachment includes a mounting plate 90 extending between and secured to the edges of a pair of spaced apart parallel chain links 91 and 92. An upstanding bearing support 93 is carried by the mounting plate 90, and a bearing insert 94 is provided therein for receiving the end 95 of an attaching pin 96 carried by the arm 30a. The pin 96 may include an enlarged shoulder 97 to maintain the stacker arm 30a in laterally spaced relationship relative to the bearing support 93 and thus the chain 38a, and an opening 98 may be provided through the end of the pin 95 for receiving a cotter pin 99 to retain the attaching pin 96 in place in the bearing 94. Washers 100a and 100b may be provided on the pin 96 on opposite sides of the bearing support 93, if desired.

In a specific example of a lumber stacking machine constructed in accordance with the invention, the stacker arms 30a–30e and 31a–31e are each approximately 15 feet 2 inches long, although the length may vary depending upon the specific dimensions and mode of intended operation of the machine. The stacker arms are preferably made of steel, and have a thickness of about 1½ inches and a height or width at their rearward ends of about 4 inches and a height or width at their forward ends of about 1 inch. The point of connection between the arm and the slide bearing is slightly toward the rearward end of the arm from the center of gravity of the arm, so that the rearward end of the arm tends to be biased downwardly even when a full course of lumber is supported on the tapered edge 70 at the forward end of the arm. This ensures that the arm does not exert a lifting force on the chain.

In this specific example, the transfer chains have a length of approximately 10 feet 10 inches between the axes of the transfer chain sprockets, and the stacker arm drive chains have a length between the axes of the sprockets 40 and 41 of approximately 5 feet 6 inches. The stacker chains are slightly longer than the stacker arm drive chains, having a length of approximately 6 feet between the axes of their drive sprockets, and the slide rods on which the slide bearings are supported have a length approximately equal to or slightly greater than the full range of movement of the stacker arms as they are carried by the stacker drive chain around the sprockets 40 and 41.

The diameters of the sprockets 40 and 41 and the length of a stacker arm and its point of connection with the slide bearing 50 is predetermined so that as the rearward end of the stacker arms are carried around the stacker arm drive sprockets, the forward end of the arm moves through a vertical distance of approximately 6 inches. Thus, when a course of lumber is formed by the stacker chains against the stop 81, the forward tapered edge 70 of the stacker arm is spaced approximately 2 inches below the course, and when the course is lifted by the arm the lowest board in the course is spaced approximately ½ inch above the stop 81. With the arm in its forwardly projected position, the last board in the course is approximately 1½ inches beyond the stop 82, whereby when the forward end of the arm is lowered, the course is located behind the stop 82, and when the arm is retracted the course is dragged off of the arm onto the arms 72 or onto a previous course.

The stacker arm drive motors 32 and 33 are preferably five horsepower variable frequency AC motors with an REX gearbox. Similarly, the stacker chain drive motors are five horsepower variable frequency AC motors. By appropriate positioning of photocells, limit switches and the like throughout the apparatus to sense the presence of lumber being handled by the apparatus, the motors can be suitably energized or de-energized to actuate the various components to advance the lumber in an orderly manner.

There are approximately 16 boards in a course, although different numbers of boards may be provided, as desired. The courses of lumber are supported on the carriage arms 72, which are indexed downwardly the thickness of a course each time a new course is added. The indexing means may comprise any suitable commercially available indexing means.

The speed of movement of the arms is substantially constant throughout a cycle, and each set of arms may be effectively operated at 20 cycles per minute, whereby the two sets of arms acting in alternating relationship with each other are capable of stacking 40 courses of lumber per minute. In fact, the machine itself is capable of operating more quickly than this, but the inertial forces acting on the lumber may cause displacement of boards at a higher rate of movement than 40 cycles per minute, or 20 cycles per minute per set of stacker arms, so that the rate of operation is effectively limited to about 40 cycles per minute.

The side-to-side spacing of the arms is depicted in FIG. 10 and is such that at least 60% of the length of each board will be supported by a minimum of a pair of arms, thereby preventing the board from tilting off of the arms.

The sorter section, incline section, unscrambler section, even ender and transfer section may all comprise conventional equipment. For example, these commercially available components may be obtained from C.S.M.I. (Consolidated Sawmill Machinery Inc.)

The stacker arm assembly of the invention is thus exceptionally simple and economical in construction and operation, and is capable of operating at a much greater rate of speed than conventional devices.

While particular embodiments of the invention have been illustrated and described in detail herein, it should be understood that various changes and modifications may be made to the invention without departing from the spirit and intent of the invention as defined by the scope of the appended claims.

What is claimed is:

1. Article stacking apparatus, comprising:

means to convey articles to an article stacking assembly;

said article stacking assembly including a plurality of elongate, parallel stacker arms each having a longitudinal axis arranged parallel to the direction of movement of articles conveyed to the article stacking assembly, and spaced so that multiple arms engage and support each article;

said stacker arms each having a rearward end oriented toward the article conveying means and an opposite, forward end, said rearward end being connected to a stacker arm drive means operable to move the arms fore and aft between extended and retracted positions relative to the direction of movement of the articles, and to raise the rearward ends of the arms in one of their retracted and extended positions and lower the rearward ends of the arms in the other of their retracted and extended positions;

said arms being pivoted between their ends on slide bearing means mounted to move fore and aft with extension and retraction of the arms by the stacker arm drive means, whereby the forward ends of the arms are elevated and lowered in opposite relationship to raising and lowering of their rearward ends, as the arms are moved between their retracted and extended positions; and said arms are positioned to lift an article and deposit it onto a stack of articles as the arms are moved between their extended and retracted positions and are raised and lowered.

2. An article stacking apparatus as claimed in claim 1, wherein:

the plurality of stacker arms include dual, independently operable sets of arms.

3. An article stacking apparatus as claimed in claim 1, wherein:

the stacker arm drive means comprises a chain disposed around a pair of spaced apart sprockets, defining a top chain flight and a bottom chain flight, said rearward end of each said stacker arm being connected to a respective chain for movement with the chain around the sprockets; and said slide bearing means moves linearly, parallel with the direction of movement of the chain flights between the sprockets.

4. An article stacking apparatus as claimed in claim 1, wherein:

the articles comprise lumber consisting of boards having predetermined length, width and thickness dimensions; and the article stacking apparatus includes means to form a layer or course of boards at the article stacking assembly, said stacker arms being operable to engage and lift the course and move it forwardly onto a stack.

5. An article stacking apparatus as claimed in claim 4, wherein:

the means to form a course of boards includes a plurality of stacker chains to engage and convey boards forwardly toward the article stacking assembly; and first board stop means is provided at said article stacking assembly, against which the boards engage as they are carried forwardly by the stacker chains to form a course of lumber.

6. An article stacking apparatus as claimed in claim 5, wherein:

second board stop means is provided at the article stacking assembly, against which a course of lumber engages after it is deposited by the stacker arms to form a stack and the arms are retracted from beneath the course.

7. An article stacking apparatus as claimed in claim 6, wherein:

the plurality of stacker arms include dual, independently operable sets of arms.

8. An article stacking apparatus as claimed in claim 7, wherein:

the stacker arm drive means comprises a chain disposed around a pair of spaced apart sprockets, defining a top chain flight and a bottom chain flight, said rearward end of each said stacker arm being connected to a respective chain for movement with the chain around the sprockets; and said slide bearing means moves linearly, parallel with the direction of movement of the chain flights between the sprockets.

9. An article stacking apparatus as claimed in claim 1, wherein:

the plurality of stacker arms include dual, independently operable sets of arms;

the stacker arm drive means comprises a chain disposed around a pair of spaced apart sprockets, defining a top chain flight and a bottom chain flight, said rearward end of each said stacker arm being connected to a respective chain for movement with the chain around the sprockets; and said slide bearing means moves linearly, parallel with the direction of movement of the chain flights between the sprockets.

10. An article stacking apparatus as claimed in claim 9, wherein:

the stacker arms are made from steel plate, with a center of gravity spaced between the ends thereof toward the rearward end that is connected with the chain drive, and the arms are pivotally connected to the slide bearing means forwardly of the center of gravity so that the rearward ends of the stacker arms have a downward bias even when a course of lumber is supported on the forward ends of the stacker arms.

11. An article stacking apparatus as claimed in claim 10, wherein:

the stacker arms are rectangular in cross-section, with a vertically oriented width dimension and a transverse thickness dimension, the width dimension of the arms being greater than the thickness dimension, and the rearward ends of the arms having a greater width than the forward ends.

12. An article stacking apparatus as claimed in claim 11, wherein:

the stacker arms have an upper edge, and the upper edge at the forward end of the arms is tapered toward the forward end, defining a surface for engaging and supporting a course of lumber.

13. An article stacking apparatus as claimed in claim 1, wherein:

the stacker arms are made from steel plate, with a center of gravity spaced between the ends thereof toward the rearward end that is connected with the chain drive, and the arms are pivotally connected to the slide bearing means forwardly of the center of gravity so that the rearward ends of the stacker arms have a downward bias even when a course of lumber is supported on the forward ends of the stacker arms.

14. An article stacking apparatus as claimed in claim 1, wherein:

each stacker arm is pivotally supported on a slide bearing, each slide bearing comprising a pivot shaft on which the arm is pivotally mounted, said shaft supported at its opposite ends on a pair of slide blocks that are slidable on a pair of spaced apart, parallel slide rods extending parallel to the direction of movement of the arms as they move between their extended and retracted positions.

15. An article stacking apparatus as claimed in claim 14, wherein:

the plurality of stacker arms include dual, independently operable sets of arms.

16. An article stacking apparatus as claimed in claim 15, wherein:

the stacker arm drive means comprises a chain disposed around a pair of spaced apart sprockets, defining a top chain flight and a bottom chain flight, said rearward end of each said stacker arm being connected to a respective chain for movement with the chain around the sprockets; and said slide bearing means moves linearly, parallel with the direction of movement of the chain flights between the sprockets.

17. An article stacking apparatus as claimed in claim 16, wherein:

the articles comprise lumber consisting of boards having predetermined length, width and thickness dimensions; and the article stacking apparatus includes means to form a layer or course of boards at the article stacking assembly, said stacker arms being operable to engage and lift the course and move it forwardly onto a stack.

18. An article stacking apparatus as claimed in claim 17, wherein:

the stacker arms are rectangular in cross-section, with a vertically oriented width dimension and a transverse thickness dimension, the width dimension of the arms being greater than the thickness dimension, and the rearward ends of the arms having a greater width than the forward ends.

19. An article stacking apparatus as claimed in claim 18, wherein:

the stacker arms have an upper edge, and the upper edge at the forward end of the arms is tapered toward the forward end, defining a surface for engaging and supporting a course of lumber.

20. An article stacking apparatus as claimed in claim 19, wherein:

the means to form a course of boards includes a plurality of stacker chains to engage and convey boards forwardly toward the article stacking assembly;

first board stop means is provided at said article stacking assembly, against which the boards engage as they are carried forwardly by the stacker chains to form a course of lumber; and second board stop means is provided at the article stacking assembly, against which a course of lumber engages after it is deposited by the stacker arms to form a stack and the arms are retracted from beneath the course.

* * * * *